United States Patent
Ishii et al.

(10) Patent No.: US 10,414,305 B2
(45) Date of Patent: Sep. 17, 2019

(54) VEHICLE SEAT AND METHOD OF MANUFACTURING VEHICLE SEAT

(71) Applicant: TACHI-S CO., LTD., Akishima-shi, Tokyo (JP)

(72) Inventors: Atsushi Ishii, Tokyo (JP); Shinichi Mizuno, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/112,190

(22) PCT Filed: Sep. 10, 2014

(86) PCT No.: PCT/JP2014/074001
§ 371 (c)(1),
(2) Date: Jul. 17, 2016

(87) PCT Pub. No.: WO2015/114874
PCT Pub. Date: Aug. 6, 2015

(65) Prior Publication Data
US 2016/0368405 A1 Dec. 22, 2016

(30) Foreign Application Priority Data

Jan. 31, 2014 (JP) .................................. 2014-016951

(51) Int. Cl.
*A47C 7/02* (2006.01)
*B60N 2/58* (2006.01)
*B60N 2/64* (2006.01)

(52) U.S. Cl.
CPC ............. *B60N 2/5866* (2013.01); *B60N 2/58* (2013.01); *B60N 2/5891* (2013.01); *B60N 2/64* (2013.01)

(58) Field of Classification Search
CPC . A47C 31/11; B60N 2/60; B60N 2/58; B60N 2/609; B60N 2/6018; B60N 2/5891; B60N 2/64; B60N 2/5866
(Continued)

(56) References Cited

U.S. PATENT DOCUMENTS 3,061,844 A * 11/1962 Coursey ............... A47C 27/001
297/219.1
4,096,016 A * 6/1978 Pohl .................... B29C 44/5636
156/272.2

(Continued)

FOREIGN PATENT DOCUMENTS

JP 59-128270 U 8/1984
JP 60-108296 U 7/1985
(Continued)

OTHER PUBLICATIONS

International Search Report from International Patent Application No. PCT/JP2014/074001, Nov. 18, 2014.
(Continued)

*Primary Examiner* — Chi Q Nguyen
(74) *Attorney, Agent, or Firm* — Shapiro, Gabor and Rosenberger, PLLC (57) ABSTRACT

A comfortable, well-designed vehicle seat (1) is provided by giving an outstanding, three-dimensional appearance to the surface layer of the vehicle seat so that a new design is achieved and that softness is improved. The vehicle seat has a seat cushion (2) serving as the sitting surface of the seat, a seatback (3) serving as the backrest of the seat, and a headrest (4) protecting the head and neck of an occupant. The surface of at least one of the seat cushion and the seatback is provided with a cover formed of a cloth including an upholstery material (6), a cushion material (8), and a heat-shrinkable material (9). The cover is stitched so that a (Continued)

plurality of bumps and dips are formed on the surface thereof.

4 Claims, 9 Drawing Sheets

(58) Field of Classification Search
USPC ............ 297/225, 228.1, 228.11, 229, 219.1, 297/452.16, 452.58, 218.2, 218.1, 452.56, 297/452.61
See application file for complete search history.

(56) References Cited

U.S. PATENT DOCUMENTS

| | | | | |
|---|---|---|---|---|
| 4,606,580 | A * | 8/1986 | Yoshizawa | B60N 2/5825 297/452.6 |
| 4,627,664 | A * | 12/1986 | Okazaki | B29D 99/0092 297/452.61 |
| 4,740,035 | A * | 4/1988 | Kazaoka | B60N 2/986 297/452.62 |
| 5,333,933 | A * | 8/1994 | Urai | D05B 39/00 297/219.1 |
| 5,395,473 | A * | 3/1995 | Nixon | B29C 63/22 156/285 |
| 7,481,489 | B2 * | 1/2009 | Demick | B60N 2/5825 297/218.1 |
| 7,837,271 | B2 * | 11/2010 | Galbreath | B60N 2/72 297/452.48 |
| 9,603,462 | B2 * | 3/2017 | Markowitz | B60N 2/60 |
| 2006/0175883 | A1 * | 8/2006 | Neustat | A47C 31/11 297/229 |
| 2007/0210043 | A1 | 9/2007 | Mastin | |
| 2016/0088951 | A1 * | 3/2016 | McGuinness | A47C 27/001 5/35 |
| 2016/0339819 | A1 * | 11/2016 | Shindo | B68G 7/05 |
| 2016/0368405 | A1 * | 12/2016 | Ishii | B60N 2/5891 |

FOREIGN PATENT DOCUMENTS

| | | |
|---|---|---|
| JP | 62-95700 U | 6/1987 |
| JP | H1-310689 A | 12/1989 |
| JP | 07-114862 B2 | 12/1995 |
| JP | 2000-211048 A | 8/2000 |
| JP | 2006-130715 A | 5/2006 |
| JP | 2011-162063 A | 8/2011 |

OTHER PUBLICATIONS

First Office Action dated Feb. 9, 2016, in Japanese Patent Application No. 2014-016951.
Second Office Action dated Apr. 26, 2016, in Japanese Patent Application No. 2014-016951.
Third Office Action dated Aug. 4, 2016, in Japanese Patent Application No. 2014-016951.
Extended European Search Report dated Aug. 30, 2017, in European Patent Application No. 14880472.7.
First Office Action dated Jun. 27, 2017, in Korean Patent Application No. 10-2016-7020853.
Second Office Action dated Dec. 26, 2017, in Korean Patent Application No. 10-2016-7020853.
First Office Action dated May 17, 2017 in Chinese Patent Application No. 201480074452.2.
Second Office Action dated Jan. 2, 2017 in Chinese Patent Application No. 201480074452.2.
Third Office Action dated Jun. 25, 2018 in Chinese Patent Application No. 201480074452.2.

* cited by examiner

VEHICLE SEAT AND METHOD OF MANUFACTURING VEHICLE SEAT

TECHNICAL FIELD

The present invention relates to a vehicle seat and a method of manufacturing the vehicle seat.

BACKGROUND ART

A vehicle seat, such as an automobile seat, is required to have various functions including safety, holdability, and getting-on/off performance (easiness in getting-on/off). The vehicle seat is also often required to improve the comfortability for an occupant, such as seat comfort and vibration absorption performance. In addition, the vehicle seat, which is the larger one of the interior parts of an automobile, is required to meet various needs for its appearance and design.

A seat cover, that is, a trim cover, significantly influences the appearance and design of the vehicle seat. The trim cover, together with a frame, accounts for a high proportion of the overall cost of the vehicle seat. It is thus important to reduce the cost of the trim cover of the vehicle seat.

Therefore, efforts are being made to allow the vehicle seat, such as an automobile seat, to reduce its manufacturing cost and to satisfy its occupant comfortability and design.

As the background art of this technical field, Japanese Patent Application Laid-Open No. 2000-211048 (Patent Literature 1) is disclosed. Patent Literature 1 discloses a quilting seat material for an automobile cushion that has nonwoven fabric layers including thermoplastic fibers, the nonwoven fabric layers being stacked and fusion-bonded onto each other on the back face of an automobile cushion seat upholstery material layer. Each nonwoven fabric layer has a cured face on at least its outer layer surface side on the opposite side of the face facing the upholstery material layer. Thus, the quilting seat material can exhibit a quilting process effect.

The quilting seat material facilitates its recycleability, and is given satisfactory bumps and dips in the quilting process. Thus, the quilting seat material has high practicability and is useful.

As another background art of this technical field, Japanese Patent Application Laid-Open No. 2006-130715 (Patent Literature 2) is disclosed. Patent Literature 2 describes an interior material that is made by setting, into a die, an upholstery material in which a fabric, a cushion layer, and a back base cloth are stacked from the surface side thereof, and then by injecting a melted thermoplastic resin into the die to integrally mold the upholstery material and the thermoplastic resin. The fabric has a difference in thermal shrinkage rate in the vertical and horizontal directions. Formed are two or more dot-shaped fusion-bonded portions between the fabric and the back base cloth via the cushion layer and in the direction in which the thermal shrinkage rate is high. A recessed stripe pattern is formed on the surface of the upholstery material in such a manner that heat received from the melted thermoplastic resin that has been injected into the die biasedly shrinks the fabric between the dot-shaped fusion-bonded portions and in the direction in which the thermal shrinkage rate of the fabric is high. Thus, the interior material has bumps and dips on its surface.

In the interior material, the fabric has a difference in thermal shrinkage rate in the vertical and horizontal directions. In addition, formed are two or more dot-shaped fusion-bonded portions between the fabric and the back base cloth via the cushion layer and in the direction in which the thermal shrinkage rate is high. Further, the recessed stripe pattern is formed on the surface of the upholstery material in such a manner that heat received from the melted thermoplastic resin that has been injected into the die biasedly shrinks the fabric between the dot-shaped fusion-bonded portions and in the direction in which the thermal shrinkage rate of the fabric is high. Thus, it is possible to integrally mold the bumps and dips shape of any design on the surface of the upholstery material without post-processing unlike conventional interior materials.

CITATIONS LIST

Patent Literature

PTL 1: Japanese Patent Application Laid-Open No. 2000-211048
PTL 2: Japanese Patent Application Laid-Open No. 2006-130715

SUMMARY OF INVENTION

Technical Problem

As described above, in the vehicle seat, such as an automobile seat, it is important to reduce its manufacturing cost and to satisfy its occupant comfortability and design.

In conventional automobile seats, for example, the upholstery material is gather-stitched to form gathers, or the cloth is gather-stitched to form gathers. The gathering process is advantageous in comfortability because the stroke of the upholstery material becomes sufficient at seating. However, the gathering process makes it difficult to control the gathers in bumps and dips appearance and position, and in some cases, gives a loose impression. This results in increasing product variation.

In typical automobile seats, the upholstery material and the thick wadding serving as a cushion material are overlapped to make a stack cloth, the surface of which being bumps and dips pattern-stitched by using a computer sewing machine. Unfortunately, it is difficult to obtain a three-dimensional shape (bumps and dips shape) sufficient for responding to the requirements only by the bumps and dips pattern-stitching process.

In the technique disclosed in Patent Literature 1, the stitching process is carried out after the thermosetting process. This makes the obtained bumps and dips shape limited and insufficient. In the technique disclosed in Patent Literature 2, the recessed stripe pattern is formed by providing the dot-shaped fusion-bonded portions. Likewise, this makes the obtained bumps and dips shape limited and insufficient.

Accordingly, an object of the present invention is to provide a comfortable, well-designed vehicle seat in which an outstanding three-dimensional appearance is formed on the surface layer thereof so that a new design is achieved and that softness is improved.

Another object of the present invention is to provide a comfortable, well-designed vehicle seat in which a three-dimensional pattern is formed on the surface layer thereof so that a new design is achieved and that the stroke of an upholstery material is sufficient at seating.

A further object of the present invention is to provide a method of manufacturing a vehicle seat that reduces its manufacturing cost and satisfies its comfortability and design.

Solution to Problem

The present invention provides a vehicle seat having a seat cushion serving as the sitting surface of the seat, a seatback serving as the backrest of the seat, and a headrest protecting the head and neck of an occupant, in which the surface of at least one of the seat cushion and the seatback is provided with a cover formed of a cloth including an upholstery material, a cushion material, and a heat-shrinkable material, in which the cover is stitched so that a plurality of bumps and dips are formed on the surface thereof.

The present invention provides a vehicle seat having a seat cushion serving as the sitting surface of the seat, a seatback serving as the backrest of the seat, and a headrest protecting the head and neck of an occupant, in which the surface of at least one of the seat cushion and the seatback is provided with a cover formed of a cloth including an upholstery material, a cushion material, and a rubber material, in which the cover is stitched so that a plurality of bumps and dips are formed on the surface thereof.

The present invention provides a method of manufacturing a vehicle seat including step (a) of overlapping at least three layers of an upholstery material, a cushion material, and a heat-shrinkable material to make a stack cloth, step (b) of pattern-stitching the stack cloth, and step (c) of heating the stack cloth.

The present invention provides a method of manufacturing a vehicle seat including step (a) of overlapping at least three layers of an upholstery material, a cushion material, and a rubber material to make a stack cloth, step (b) of pattern-stitching the stack cloth in a state where the rubber material is mechanically extended, and step (c) of releasing the extension of the rubber material.

Advantageous Effects of Invention

According to the present invention, it is possible to achieve the comfortable, well-designed vehicle seat in which an outstanding three-dimensional appearance is formed on the surface layer thereof so that a new design is achieved and that softness is improved.

In addition, according to the present invention, it is possible to achieve the comfortable, well-designed vehicle seat in which a three-dimensional pattern is formed on the surface layer thereof so that a new design is achieved and that the stroke of the upholstery material is sufficient at seating.

Further, according to the present invention, it is possible to achieve the method of manufacturing the vehicle seat that reduces its manufacturing cost and satisfies its comfortability and design.

Problems, configurations, and effects other than the above will be apparent from the description of the following embodiments.

DESCRIPTION OF EMBODIMENTS

Examples of the present invention will now be described with reference to the drawings.

Example 1

Figure 1:
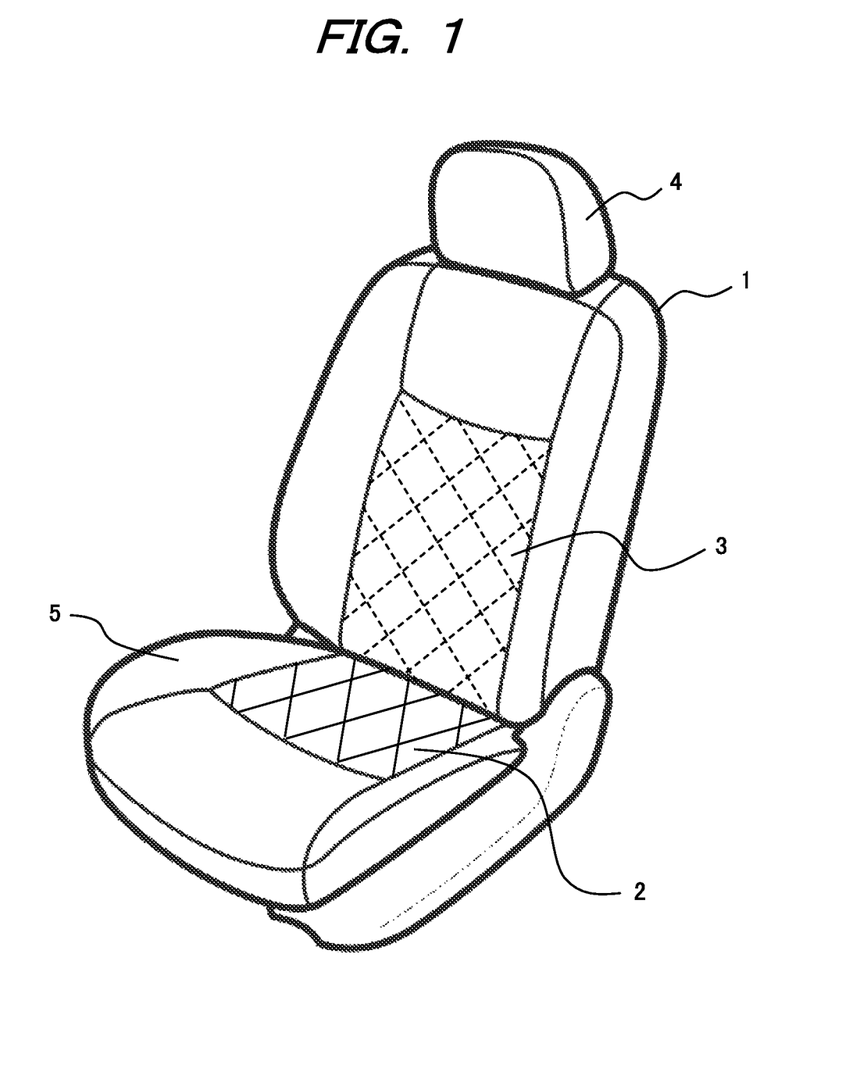
FIG. 1 is a diagram illustrating an overview of a vehicle seat according to an embodiment of the present invention.

FIG. 1 illustrates an overview of a vehicle seat used in an automobile according to an example of the present invention. As illustrated in FIG. 1, a vehicle seat 1 according to Example 1 has, as its main portions, a seat cushion 2 serving as the sitting surface of the seat, a seatback 3 serving as the backrest of the seat, and a headrest 4 protecting the head and neck of an occupant. Side supports 5 are provided on both sides of the seat cushion 2. The side supports 5 support the side portions of the sitting surface. Onto the surface of the seat cushion 2 or the surface of the seatback 3 in FIG. 1, a grid pattern is pattern-stitched as the typical example of the design of the surface. The grid pattern on the seat cushion 2 or the grid pattern on the seatback 3 is three-dimensional by forming a plurality of bumps and dips on the surface of the cloth by precise stitching by using a computer sewing machine or a multi-shaft sewing machine.

Figure 2:
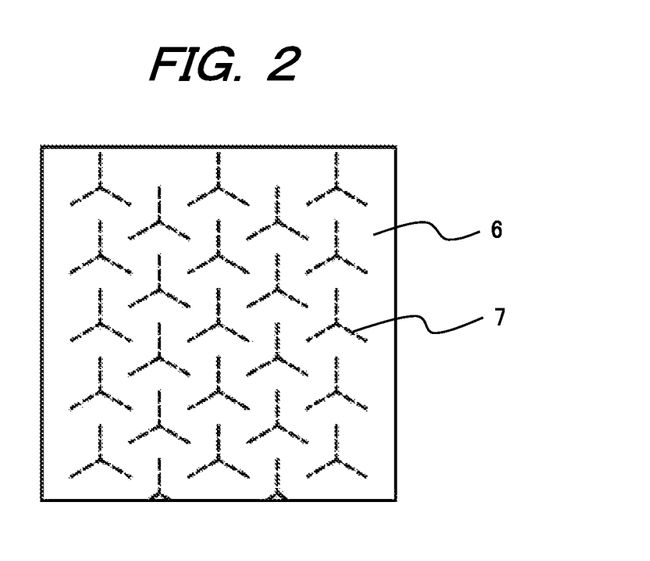
FIG. 2 is a diagram illustrating the surface of part of a vehicle seat according to an embodiment of the present invention.
Figure 3:
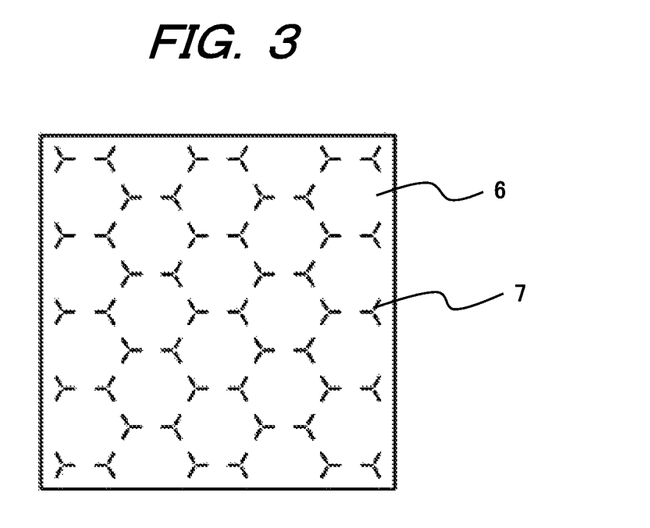
FIG. 3 is a diagram illustrating the surface of part of a vehicle seat according to an embodiment of the present invention.

FIGS. 2 and 3 illustrate other three-dimensional patterns provided on the surface of the seat cushion 2 or the surface of the seatback 3 of the vehicle seat according to Example 1. In FIG. 2, a plurality of patterns each extending in three directions from the center point thereof are provided at fixed intervals. In FIG. 3, a plurality of patterns each having a hexagonal shape whose sides are in contact with the sides of other hexagonal shapes are continuously provided. The patterns in FIGS. 2 and 3, which are difficult to see in the drawings, have larger bumps and dips or steps on the surface than conventional stitched patterns.

Figure 4:
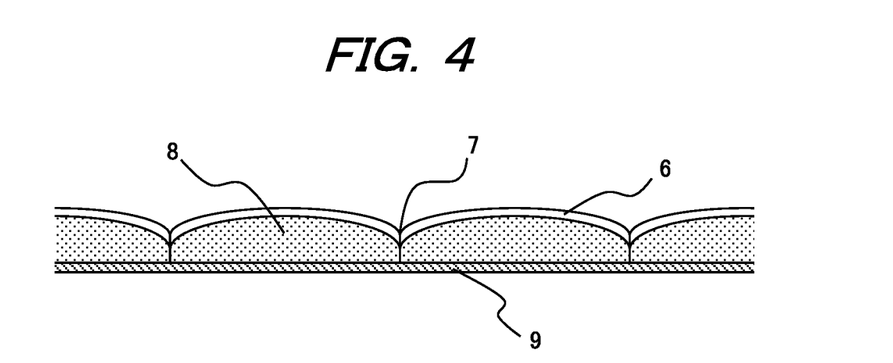
FIG. 4 is a diagram illustrating the cross section of part of a vehicle seat according to an embodiment of the present invention.

FIG. 4 illustrates the cross section of part of the seat cushion 2 or the seatback 3 of the vehicle seat according to Example 1. The seat cushion 2 or the seatback 3 according to Example 1 includes a seat cover, that is, a trim cover, made of a cloth including three layers of an upholstery material 6, a thick wadding 8 serving as a cushion material, and a heat-shrinkable material 9 that is heat-shrunk by heating, from the surface side thereof. The thick wadding 8 is e.g., urethane or cotton having high cushioning properties. The heat-shrinkable material 9 is polyester.

The cloth including the three layers of the upholstery material 6, the thick wadding 8, and the heat-shrinkable material 9 is pattern-stitched by stitching threads 7 to form a three-dimensional pattern on the surface of the upholstery material 6. After the three layers of the upholstery material 6, the thick wadding 8, and the heat-shrinkable material 9 are overlapped, the heat-shrinkable material 9 is heated and heat-shrunk to form large bumps and dips (steps) on the upholstery material 6.

Figure 6:
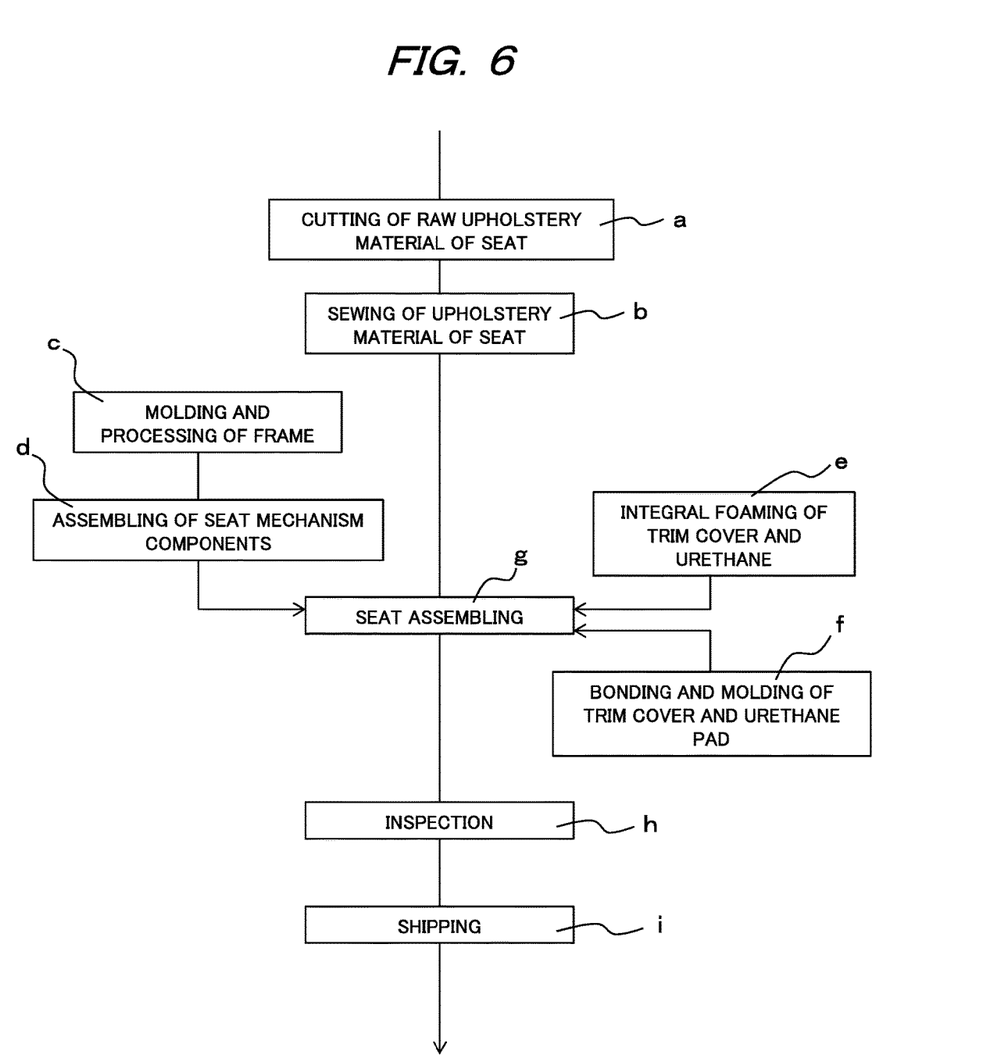
FIG. 6 is a flowchart illustrating an overview of a process for manufacturing a vehicle seat according to an embodiment of the present invention.

Referring to FIGS. 6 to 8 and FIGS. 9 to 12, a method of manufacturing the vehicle seat according to Example 1 will be described. FIG. 6 illustrates an overview of a process for manufacturing the vehicle seat according to Example 1. In step a, the raw upholstery material of the seat cover, that is, the trim cover, is cut. Subsequently, the respective pieces of the cut upholstery material are sewn (step b). In another line, a metal material is molded and processed to form a frame (step c), and seat mechanism components, such as a reclining adjuster and a seat lever, are then assembled (step d). In a further line, the trim cover and urethane are integrally foamed (step e), and the trim cover and the urethane pad are then bonded and molded (step f). As illustrated in FIG. 6, the respective portions of the seat formed in the steps are assembled as a final product in seat assembling (step g). Thereafter, the vehicle seat is inspected (step h), and is then shipped to an automobile maker (step i).

Figure 7:
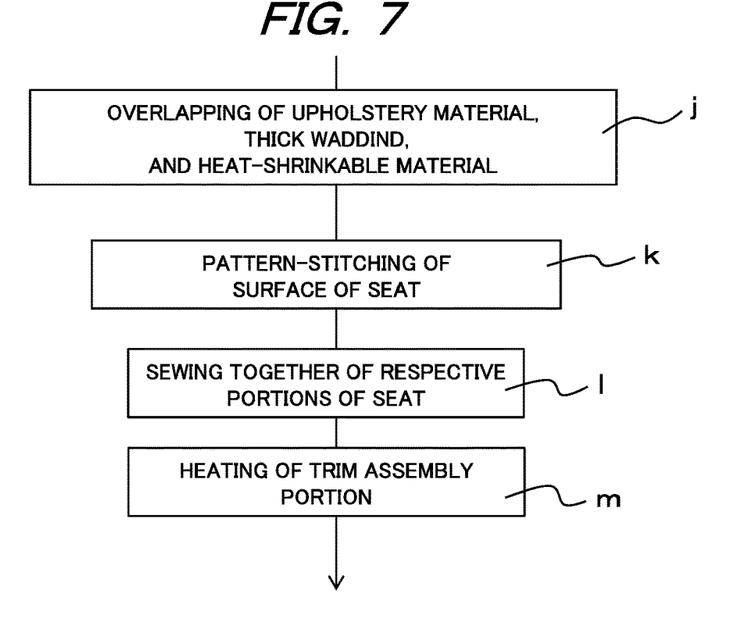
FIG. 7 is a flowchart illustrating a process for sewing a vehicle seat according to an embodiment of the present invention.
Figure 10:
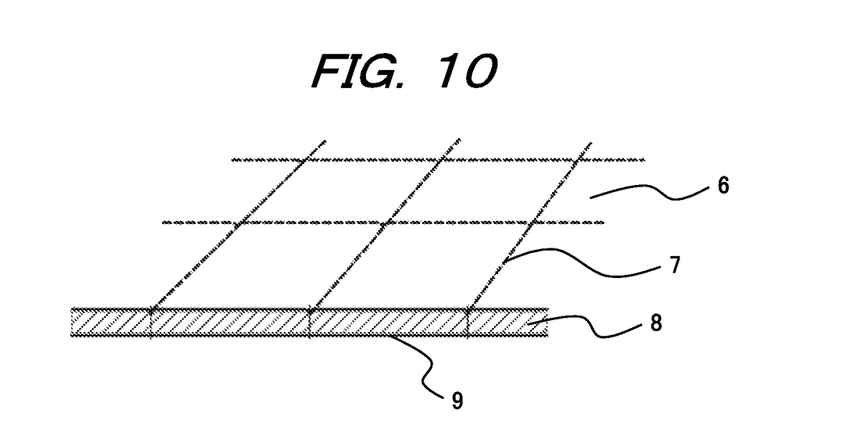
FIG. 10 is a diagram illustrating the cross section of part of a vehicle seat according to an embodiment of the present invention.

FIG. 7 illustrates the details of the step of sewing the respective pieces of the upholstery material (step b). The upholstery material 6, the thick wadding 8, such as urethane, and the heat-shrinkable material 9, such as polyester, are overlapped in three layers to form a stack cloth (step j). Then, the surface of the stack cloth, that is, the surface of the seat, is precisely pattern-stitched by using a computer sewing machine or a multi-shaft sewing machine (step k). Here, the pattern to be stitched can be freely selected from a plurality of patterns that are previously registered to the computer. FIG. 10 illustrates the cross section of the stack cloth that has been stitched in step k. The stack cloth at this stage is in the same state as conventional pattern-stitched stack cloths. Thus, the bumps and dips (steps) on the surface of the upholstery material 6 by the stitching threads 7 have the same size as the conventional pattern-stitched stack cloths.

Figure 9:
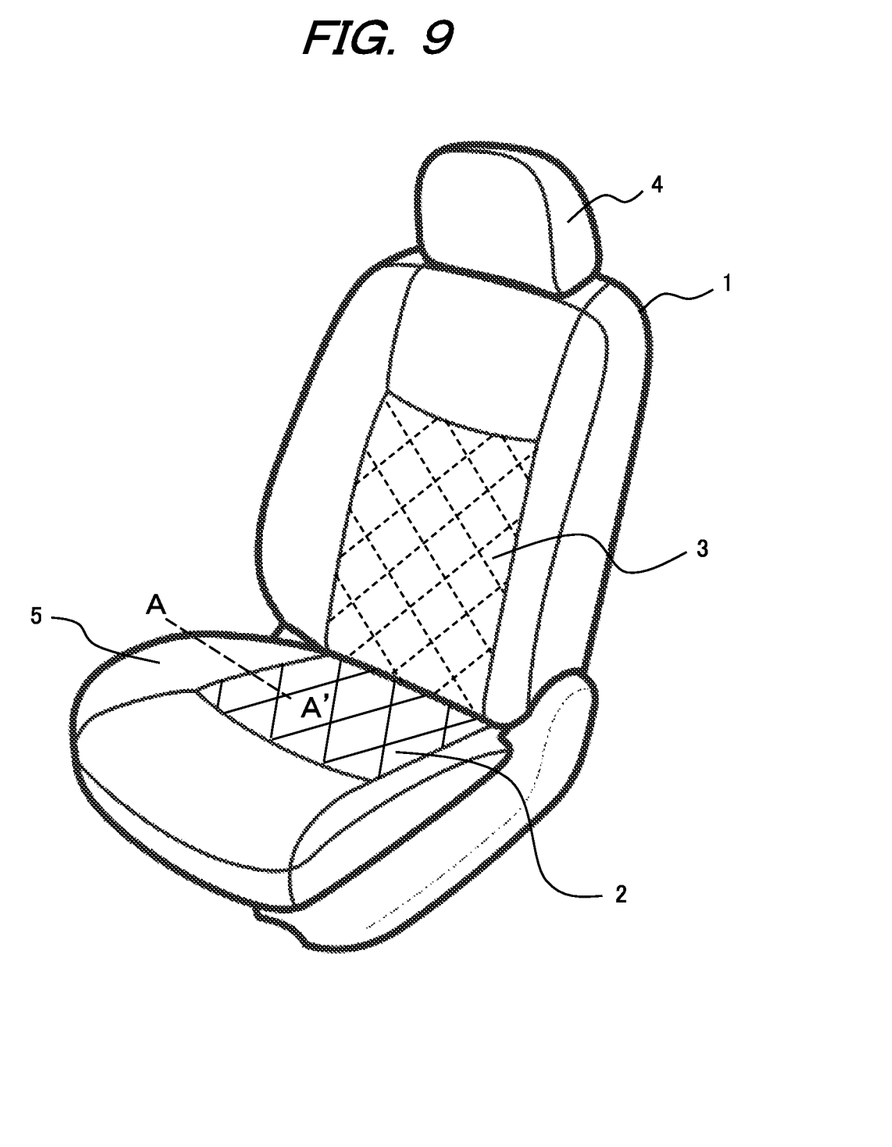
FIG. 9 is a diagram illustrating an overview of a vehicle seat according to an embodiment of the present invention.
Figure 11:
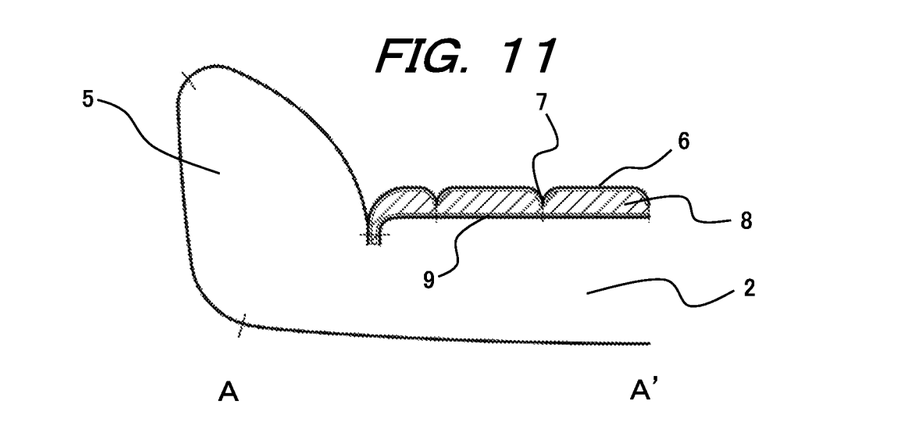
FIG. 11 is a diagram illustrating the cross section of part of a vehicle seat according to an embodiment of the present invention.

The respective portions of the seat formed in step a in FIG. 6 are sewn together in the shape of the vehicle seat cover (step l). FIG. 11 illustrates the cross section of part of the stack cloth at this stage. FIG. 11 corresponds to the cross section taken along line A-A' in FIG. 9 illustrating an overview of the vehicle seat. All the portions of the seat to be sewn together may include the stack cloth in which the upholstery material 6, the thick wadding 8, and the heat-shrinkable material 9 are overlapped in three layers. In addition, according to the portion of the seat to be used, a combination of the portion including the stack cloth and a conventional cloth in two layers of the upholstery material 6 and the thick wadding 8 may be used.

Figure 12:
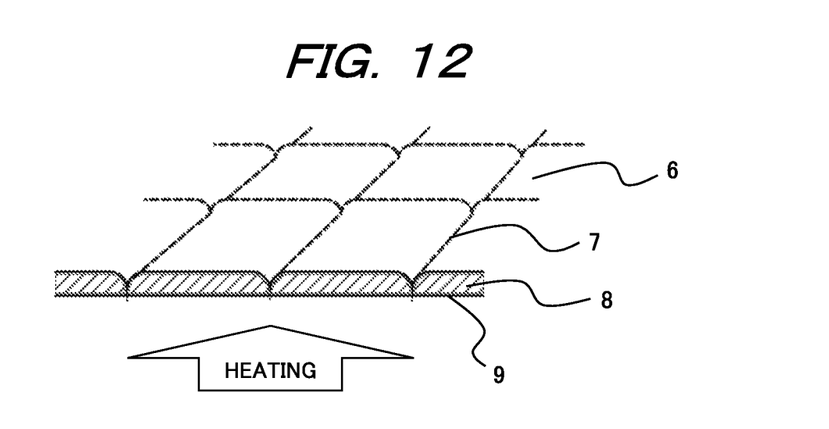
FIG. 12 is a diagram illustrating the cross section of part of a vehicle seat according to an embodiment of the present invention.

Thereafter, as illustrated in FIG. 12, the pattern-stitched stack cloth, which includes the three layers of the upholstery material 6, the thick wadding 8, and the heat-shrinkable material 9, is heated to heat-shrink the heat-shrinkable material 9 (step m). The heating process shrinks the heat-shrinkable material 9 to form large bumps and dips (steps) on the surface of the stitched upholstery material 6, that is, on the surface of the seat cover.

Figure 8:
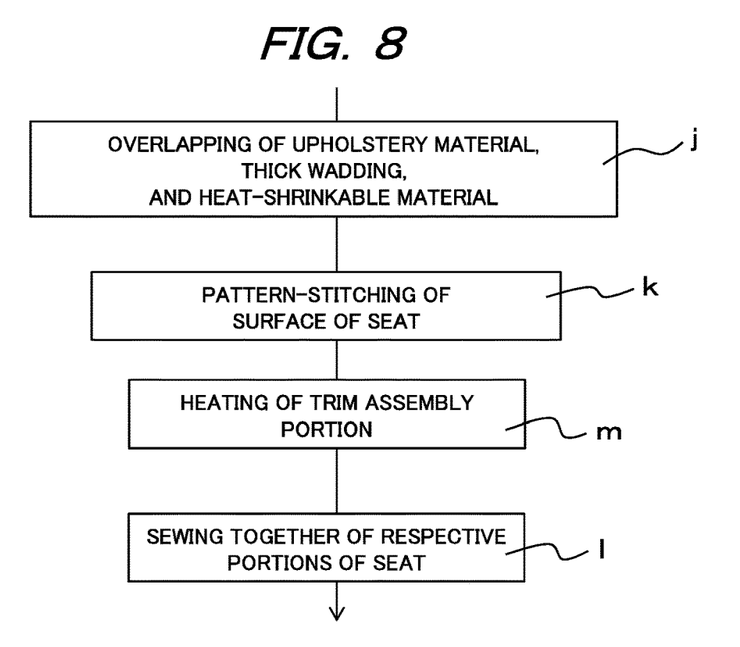
FIG. 8 is a flowchart illustrating a process for sewing a vehicle seat according to an embodiment of the present invention.

FIG. 8 illustrates a modification of the process for sewing the respective pieces of the upholstery material according to Example 1 (step b). As illustrated in FIG. 8, it is possible to carry out step m in FIG. 7 before step l. That is, before the respective pieces of the upholstery material are sewn, the stack cloth including the three layers of the upholstery material 6, the thick wadding 8, and the heat-shrinkable material 9 is heated. Then, large bumps and dips (steps) are formed on the surface of the stitched upholstery material 6, that is, on the surface of the seat cover, in only the portion including the stack cloth. Subsequently, the respective portions of the seat are sewn together to form the seat cover, that is, the trim cover.

The pattern of the bumps and dips (steps) on the surface of the seat cover is set according to request, such as a grid pattern, as described in FIG. 1, or a regular pattern, that is, a geometric pattern, as described in FIGS. 2 and 3.

As described above, according to Example 1, it is possible to achieve the comfortable, well-designed vehicle seat in which an outstanding three-dimensional appearance is formed on the surface layer thereof so that a new design is achieved and that softness is improved. In addition, the bumps and dips (steps) formed on the surface of the seat improve fit feeling when the occupant sits thereon, provide reliable three-dimensionality to improve air permeability, and eliminate the friction between the occupant being seated and the stitching threads to improve the durability of the stitching threads. Further, in the method of manufacturing the vehicle seat, the heat-shrinkable material is used as part of the material of the vehicle seat. Thus, without using a special sewing machine, it is possible to manufacture the vehicle seat that reduces its manufacturing cost and satisfies its comfortability and design.

Example 2

Figure 5:
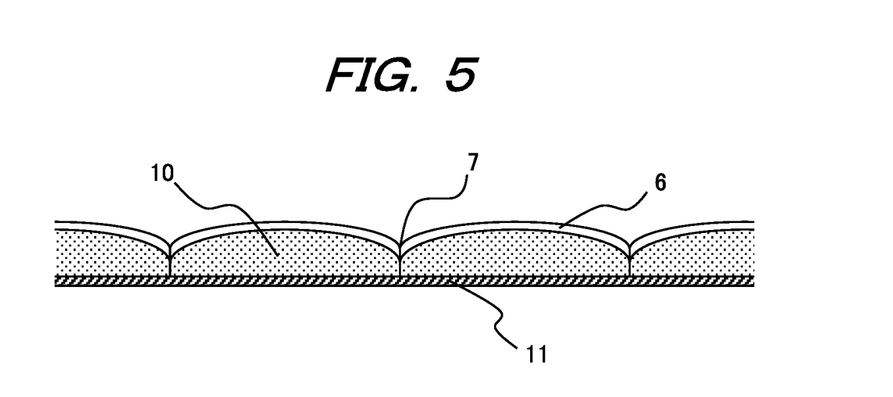
FIG. 5 is a diagram illustrating the cross section of part of a vehicle seat according to an embodiment of the present invention.

FIG. 5 illustrates the cross section of part of the seat cushion 2 or the seatback 3 of the vehicle seat according to another embodiment of the present invention. In the description of the vehicle seat according to Example 2, the details of the portions shared with Example 1 are omitted.

The seat cushion 2 or the seatback 3 of the vehicle seat 1 according to Example 2 includes a seat cover, that is, a trim cover, made of a cloth including three layers of the upholstery material 6, cotton 10 serving as a cushion material, and an expandable planate rubber 11, from the surface side thereof. The cloth including the three layers of the upholstery material 6, the cotton 10, and the planate rubber 11 is pattern-stitched by the stitching threads 7, and as with Example 1, the three-dimensional pattern is formed on the surface of the upholstery material 6. After the three layers of the upholstery material 6, the cotton 10, and the planate rubber 11 are overlapped, the planate rubber 11 is then stitched in a state where the planate rubber 11 is mechanically extended. FIG. 5 illustrates the planate rubber 11 whose mechanical extension is released after the stitching process. The planate rubber 11 whose mechanical extension is released returns to a state before it is mechanically extended. Thus, large bumps and dips (steps) are formed on the upholstery material 6.

Referring to FIGS. 13 to 16, a method of manufacturing the vehicle seat according to Example 2 will be described. The vehicle seat according to Example 2 is manufactured through the same process as Example 1, that is, through the process as illustrated in FIG. 6. In the description of the method of manufacturing the vehicle seat according to Example 2, the details of the portions shared with Example 1 are omitted.

Figure 13:
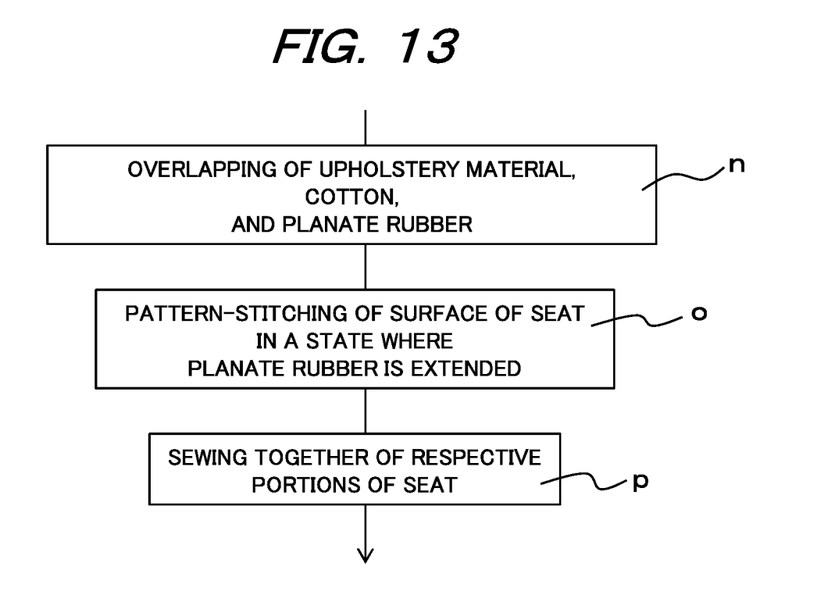
FIG. 13 is a flowchart illustrating a process for sewing a vehicle seat according to an embodiment of the present invention.
Figure 14:
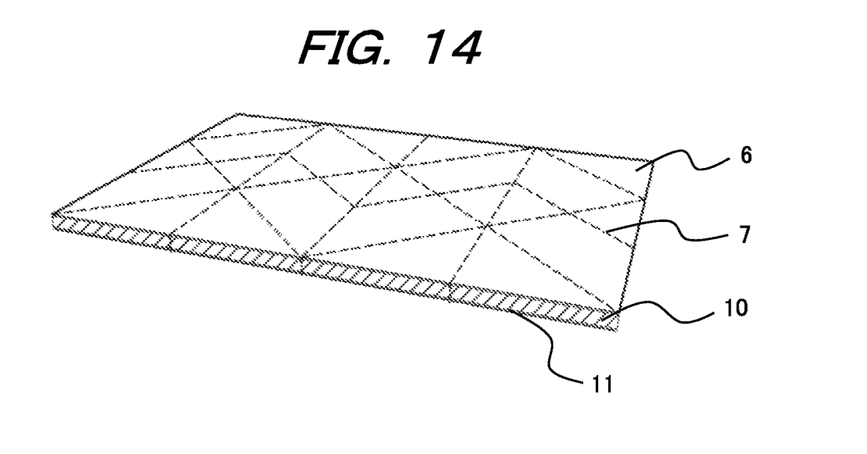
FIG. 14 is a diagram illustrating the cross section of part of a vehicle seat according to an embodiment of the present invention.

FIG. 13 illustrates the details of the sewing process according to Example 2, that is, the details of the step of sewing the respective pieces of the upholstery material in FIG. 6 (step b). The upholstery material 6, the cotton 10 serving as a cushion material, and the extendable planate rubber 11 are overlapped in three layers to form a stack cloth (step n). Then, the planate rubber 11 is maintained so as to be extended by mechanical means to precisely pattern-stitch the surface of the stack cloth, that is, the surface of the seat, by using a computer sewing machine or a multi-shaft sewing machine (step o). As with Example 1, the pattern to be stitched can be freely selected from a plurality of patterns that are previously registered to the computer. FIG. 14 illustrates the cross section of the stack cloth that has been stitched in step o. The stack cloth at this stage maintains the planate rubber 11 mechanically extended, and is in the same state as conventional pattern-stitched stack cloths. Thus, the bumps and dips (steps) on the surface of the upholstery material 6 by the stitching threads 7 have the same size as the conventional pattern-stitched stack cloths.

Figure 15:
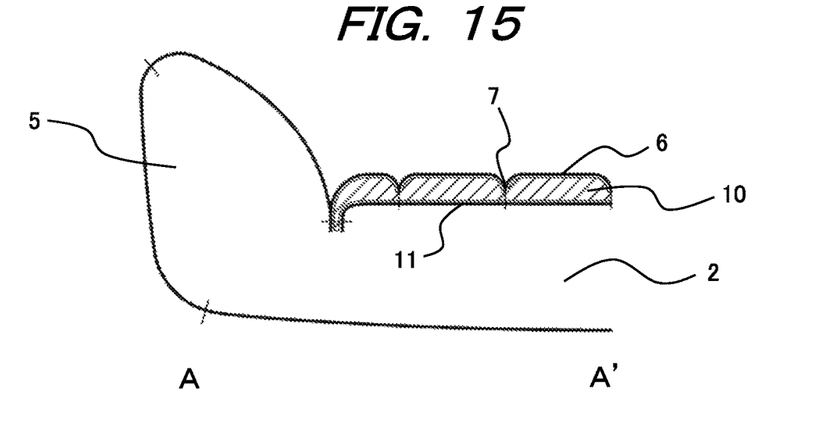
FIG. 15 is a diagram illustrating the cross section of part of a vehicle seat according to an embodiment of the present invention.

The respective portions of the seat formed in step a in FIG. 6 are sewn together in the shape of the vehicle seat cover (step p). FIG. 15 illustrates the cross section of part of the stack cloth at this stage. FIG. 15 corresponds to the cross section taken along line A-A' in FIG. 9 illustrating an overview of the vehicle seat. All the portions of the seat to be sewn together may include the stack cloth in which the upholstery material 6, the cotton 10, and the planate rubber 11 are overlapped in three layers. In addition, according to the portion of the seat to be used, a combination of the portion including the stack cloth and a conventional cloth in two layers of the upholstery material 6 and the cotton 10 may be used.

Figure 16:
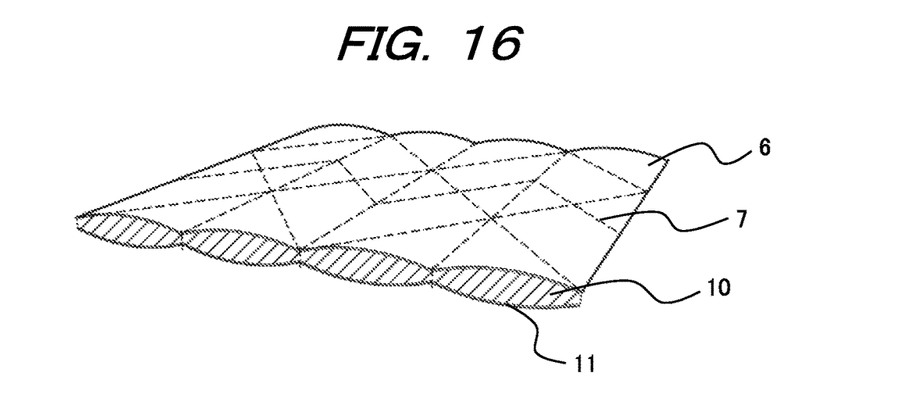
FIG. 16 is a diagram illustrating the cross section of part of a vehicle seat according to an embodiment of the present invention.

Thereafter, as illustrated in FIG. 16, by releasing the extension of the mechanically extended planate rubber 11, the stress, that is, the shrinking force, which returns the planate rubber 11 to a state before the planate rubber 11 is extended, acts to form large bumps and dips (steps) on the surface of the stitched upholstery material 6, that is, on the surface of the seat cover.

As with Example 1, the pattern of the bumps and dips (steps) on the surface of the seat cover is set according to request, such as a grid pattern, as described in FIG. 1, or a regular pattern, that is, a geometric pattern, as described in FIGS. 2 and 3.

As described above, according to Example 2, it is possible to achieve the comfortable, well-designed vehicle seat in which the three-dimensional pattern is formed on the surface layer thereof so that a new design is achieved and that the stroke of the upholstery material is sufficient at seating. In addition, the bumps and dips (steps) formed on the surface of the seat improve fit feeling when the occupant sits thereon, provide reliable three-dimensionality to improve air permeability, and eliminate the friction between the occupant being seated and the stitching threads to improve the durability of the stitching threads. Further, in the method of manufacturing the vehicle seat, the planate rubber is used as part of the material of the vehicle seat. Thus, without using a special sewing machine, it is possible to manufacture the vehicle seat that reduces its manufacturing cost and satisfies its comfortability and design.

The present invention is not limited to the above examples, and includes various modifications. For example, the above examples have been described in detail for clearly understandably describing the present invention, and do not always include all the above configurations. In addition, part of the configuration of one of the examples can be replaced with the configuration of the other examples. Further, the configuration of one of the examples can be added with the configuration of the other examples. Furthermore, part of the configuration of each example can be added with, deleted from, and replaced with the configuration of the other examples.

REFERENCE SIGNS LIST

1 . . . vehicle seat,
2 . . . seat cushion,
3 . . . seatback,
4 . . . headrest,
5 . . . side support,
6 . . . upholstery material,
7 . . . stitching thread,
8 . . . thick wadding,
9 . . . heat-shrinkable material,
10 . . . cotton,
11 . . . planate rubber.

The invention claimed is:

1. A vehicle seat comprising:
a seat cushion serving as a sitting surface of the seat;
a seatback serving as a backrest of the seat; and
a headrest disposed to protect an occupant's head and neck,
wherein a surface of at least one of the seat cushion and the seatback is provided with a cover formed of a cloth including an upholstery material, a cushion material, and a rubber material, a surface of the upholstery material having a plurality of bumps and dips, and
wherein the bumps and dips are formed by stitching the cover with the rubber material being in a mechanically extended state, and thereafter releasing the extension of the rubber material.

2. The vehicle seat according to claim 1, wherein the plurality of bumps and dips provide a three-dimensional pattern on the surface of the stitched upholstery material.

3. The vehicle seat according to claim 2, wherein the three-dimensional pattern on the surface is geometric.

4. The vehicle seat according to claim 1, wherein the cushion material is urethane or cotton.

* * * * *